United States Patent
Tanaka (10) Patent No.: US 7,906,232 B2
(45) Date of Patent: Mar. 15, 2011

(54) FUEL CELL CASING WITH DEPRESSURIZING COVER

(75) Inventor: Hideyuki Tanaka, Kariya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1047 days.

(21) Appl. No.: 11/661,701

(22) PCT Filed: Feb. 24, 2006

(86) PCT No.: PCT/JP2006/003412
§ 371 (c)(1),
(2), (4) Date: Mar. 2, 2007

(87) PCT Pub. No.: WO2006/090835
PCT Pub. Date: Aug. 31, 2006

(65) Prior Publication Data
US 2007/0259254 A1    Nov. 8, 2007

(30) Foreign Application Priority Data
Feb. 25, 2005  (JP) ................. 2005-052024

(51) Int. Cl.
*H01M 8/04* (2006.01)
(52) U.S. Cl. ............. 429/56; 429/53; 220/89.1; 137/551
(58) Field of Classification Search .............. 429/53, 429/56; 220/89.1; 137/551
See application file for complete search history.

(56) References Cited

U.S. PATENT DOCUMENTS

| 7,294,354 B2 * | 11/2007 | Gunter et al. ................. 426/118 |
| 2002/0187380 A1 * | 12/2002 | Tanaka et al. .................. 429/34 |

FOREIGN PATENT DOCUMENTS

| JP | 60-062064 A | 4/1985 |
| JP | 2-13283 U | 1/1990 |
| JP | 2001-036199 A | 2/2001 |
| JP | 2002-367647 A | 12/2002 |
| JP | 2003-197483 | 7/2003 |
| JP | 2003-229150 | 8/2003 |

* cited by examiner

*Primary Examiner* — Dah-Wei D Yuan
*Assistant Examiner* — Zachary Best
(74) *Attorney, Agent, or Firm* — Kenyon & Kenyon LLP (57) ABSTRACT

A fuel cell casing having a laminate structure of a first double-sided adhesive tape, an interposed member, and a second double-sided adhesive tape. The laminate structure may be placed between a casing body and a depressurizing cover. In the fuel cell casing of this structure, adequate selection of the material for the interposed member and adequate specification of an adhesion area of at least either the first double-sided adhesive tape or the second double-sided adhesive tape to the interposed member readily attain the desired design of ensuring easy separation of the depressurizing cover from the casing body by simple application of a force to the depressurizing cover under a preset level of inner pressure, without changing the materials of the casing body and the depressurizing cover.

12 Claims, 4 Drawing Sheets

FUEL CELL CASING WITH DEPRESSURIZING COVER

This is a 371 national phase application of PCT/JP2006/303412 filed 24 Feb. 2006, which claims priority to Japanese Patent Application No. 2005-052024 filed 25 Feb. 2005, the contents of which are incorporated herein by reference.

TECHNICAL FIELD

The present invention relates to a fuel cell casing and more specifically pertains to the fuel cell casing for storing fuel cells therein.

BACKGROUND ART

A proposed fuel cell casing mounted on a vehicle has a pressure release hole that is formed in a casing body and is covered with a cover member. For example, in a fuel cell casing disclosed in Japanese Patent Laid-Open Gazette No. 2002-367647, a cover member is stuck to a casing body by means of a double-sided adhesive tape to be openable by a force applied to the cover member under a preset level of inner pressure of the fuel cell casing. This arrangement releases the inner pressure of the fuel cell casing and thereby protects the fuel cell casing from damages.

DISCLOSURE OF THE INVENTION

In the fuel cell casing, the cover member and the casing body are generally made of resin. The cover member is thus firmly bonded to the casing body via the double-sided adhesive tape having one face tightly adhering to the casing body and the other face tightly adhering to the cover member.

In the prior art structure, separation of the cover member from the casing body in response to an increase in inner pressure of the fuel cell casing to the preset level requires the overall design change of the casing body and the cover member, for example, change of the materials of the casing body and the cover member.

The object of the invention is thus to eliminate the drawbacks of the prior art technique and to provide a fuel cell casing that is designed to readily open a cover member in response to an increase in inner pressure of the fuel cell casing to a preset level.

In order to attain at least part of the above and the other related objects, the fuel cell casing of the invention has the configurations discussed below.

One application of the invention is directed to a fuel cell casing for storing fuel cells therein. The fuel cell casing includes:

a casing body;

a depressurizing hole that is formed in the casing body to release inner pressure of the fuel cell casing;

a cover member that covers over the depressurizing hole;

a first double-sided adhesive member that has adhesive function on two faces thereof and is stuck on its one face to the casing body along circumference of the depressurizing hole;

a second double-sided adhesive member that has adhesive function on two faces thereof and is stuck to the cover member on its other face opposite to one face close to the first double-sided adhesive member; and an interposed member that is interposed between the first double-sided adhesive member and the second double-sided adhesive member and is detached, in response to an increase in inner pressure of said fuel cell casing to a preset level, at least one of an adhesive face of the first double-sided adhesive member to the interposed member and an adhesive face of the second double-sided adhesive member to the interposed member, prior to detachment of the first double-sided adhesive member from the casing body and detachment of the second double-sided adhesive member from the cover member.

In the fuel cell casing of this application, the laminate structure of the first double-sided adhesive member, the interposed member, and the second double-sided adhesive member is placed between the casing body and the cover member. In this application, when the inner pressure of the fuel cell casing increases to the preset level, the adhesive face of at least either the first double-sided adhesive member or the second double-sided adhesive member is detached from the interposed member in the laminate structure by the force applied to the cover member. Such detachment opens the cover member to release the inner pressure of the fuel cell casing through the depressurizing hole. In the fuel cell casing of this structure, adequate selection of the material for the interposed member and adequate specification of the adhesion area of at least either the first double-sided adhesive member or the second double-sided adhesive member to the interposed member readily attain the desired design of ensuring easy separation of the cover member from the casing body by simple application of a force to the cover member under the preset level of inner pressure, without changing the materials of the casing body and the cover member. Here the force applied to the cover member under the preset level of the inner pressure may be insufficient for separation of the adhesive face of the first double-sided adhesive member from the casing body and for separation of the adhesive face of the second double-sided adhesive member from the cover member. The fuel cell casing of this arrangement is thus readily designable to open the cover member in response to an increase in inner pressure of the fuel cell casing to the preset level. The preset level here and in the following description is set empirically or otherwise as an abnormal level of the inner pressure of the fuel cell casing increased due to ignition of hydrogen leaked from the fuel cells. The first double-sided adhesive member is preferably formed as a continuous member along the circumference of the depressurizing hole, but may be formed as discrete members.

In one preferable embodiment of this application, the fuel cell casing further includes: an air hole that is formed in the casing body for air vent; a gas permeation membrane that covers over the air hole and allows permeation of only a gas component; and a third double-sided adhesive member that has adhesive function on two faces thereof, is stuck on its one face to the casing body along circumference of the air hole, and is stuck on its other face to the gas permeation membrane so that the other face of the third double-sided adhesive member is detached from the gas permeation membrane in response to an increase in inner pressure of the fuel cell casing to a certain level equivalent to the preset level. In the fuel cell casing of this embodiment having both the depressurizing hole and the air hole formed in the casing body, adequate selection of the material for the interposed member and adequate specification of the adhesion area of at least either the first double-sided adhesive member or the second double-sided adhesive member to the interposed member readily attain the desired design of ensuring substantially simultaneous separation of the cover member and the gas permeation membrane from the casing body in response to an increase in inner pressure of the fuel cell casing to the preset level, without changing the materials of the casing body and the cover member.

Another application of the invention is directed to a fuel cell casing for storing fuel cells therein. The fuel cell casing includes:

a casing body;

a depressurizing hole that is formed in the casing body to release inner pressure of the fuel cell casing;

a cover member that covers over the depressurizing hole;

a first double-sided adhesive member that has adhesive function on two faces thereof and is stuck on its one face to the casing body along circumference of the depressurizing hole;

a second double-sided adhesive member that has adhesive function on two faces thereof and is stuck to the cover member on its other face opposite to one face close to the first double-sided adhesive member; and an interposed member that is interposed between the first double-sided adhesive member and the second double-sided adhesive member and is bonded to the first double-sided adhesive member and to the second double-sided adhesive member, where at least one of an adhesive force of the interposed member to the first double-sided adhesive member and an adhesive force of the interposed member to the second double-sided adhesive member is smaller than an adhesive force of the first double-sided adhesive member to the casing body and an adhesive force of the second double-sided adhesive member to the cover member.

In the fuel cell casing of this application, the laminate structure of the first double-sided adhesive member, the interposed member, and the second double-sided adhesive member is placed between the casing body and the cover member. In this application, the adhesive force of at least either the first double-sided adhesive member or the second double-sided adhesive member to the interposed member is smaller than the adhesive force of the first double-sided adhesive member to the casing body and the adhesive force of the second double-sided adhesive member to the cover member. Even when there are the large adhesive force of the first double-sided adhesive member to the casing body and the large adhesive force of the second double-sided adhesive member to the cover member, adequate selection of the material for the interposed member and adequate specification of the adhesion area of at least either the first double-sided adhesive member or the second double-sided adhesive member to the interposed member desirably weakens the adhesive force of at least either the first double-sided adhesive member or the second double-sided adhesive member to the interposed member, without changing the materials of the casing body and the cover member. The fuel cell casing of this arrangement is thus readily designable to open the cover member in response to an increase in inner pressure of the fuel cell casing to the preset level.

In one preferable embodiment of this application, the fuel cell casing further includes: an air hole that is formed in the casing body for air vent; a gas permeation membrane that covers over the air hole and allows permeation of only a gas component; and a third double-sided adhesive member that has adhesive function on two faces thereof, is stuck on its one face to the casing body along circumference of the air hole, and is stuck on its other face to the gas permeation membrane with an adhesive force practically equivalent to an adhesive force of at least either the first double-sided adhesive member or the second double-sided adhesive member to the interposed member. In the fuel cell casing of this embodiment having both the depressurizing hole and the air hole formed in the casing body, adequate selection of the material for the interposed member and adequate specification of the adhesion area of at least either the first double-sided adhesive member or the second double-sided adhesive member to the interposed member readily attain the desired design of making the adhesive force of at least either the first double-sided adhesive member or the second double-sided adhesive member to the interposed member practically identical with the adhesive force of the third double-sided adhesive member to the gas permeation membrane, without changing the materials of the casing body and the cover member.

In the fuel cell casing of the embodiment having the gas permeation membrane to cover over the air hole and allow permeation of only the gas component, the interposed member may be made of a material that is practically identical with material of the gas permeation membrane. In this structure, the adhesive strength (adhesive force per unit area) of the casing body to the cover member is substantially the same as the adhesive strength of the casing body to the gas permeation membrane. This further facilitates the design of attaining the substantially simultaneous separation of the cover member and the gas permeation membrane from the casing body in response to an increase in inner pressure of the fuel cell casing to the preset level.

In the fuel cell casing of the invention having any of the above arrangements, at least one of the first double-sided adhesive member, the second double-sided adhesive member, and the third double-sided adhesive member may be a double-sided adhesive tape including a base member with an adhesive applied on two faces thereof.

In the fuel cell casing of the invention having any of the above arrangements, the cover member may be fixed to the casing body in freely openable and closable manner. For example, part of the cover member is fixed to the casing body by means of a hinge, so that the cover member is freely openable and closable relative to the casing body. This structure keeps the open cover member in linkage with the casing body when the inner pressure of the fuel cell casing increases to the preset level. In the fuel cell casing of the invention having the gas permeation membrane, the gas permeation membrane may be fixed to the casing body in freely openable and closable manner.

BEST MODES OF CARRYING OUT THE INVENTION

Figure 1:
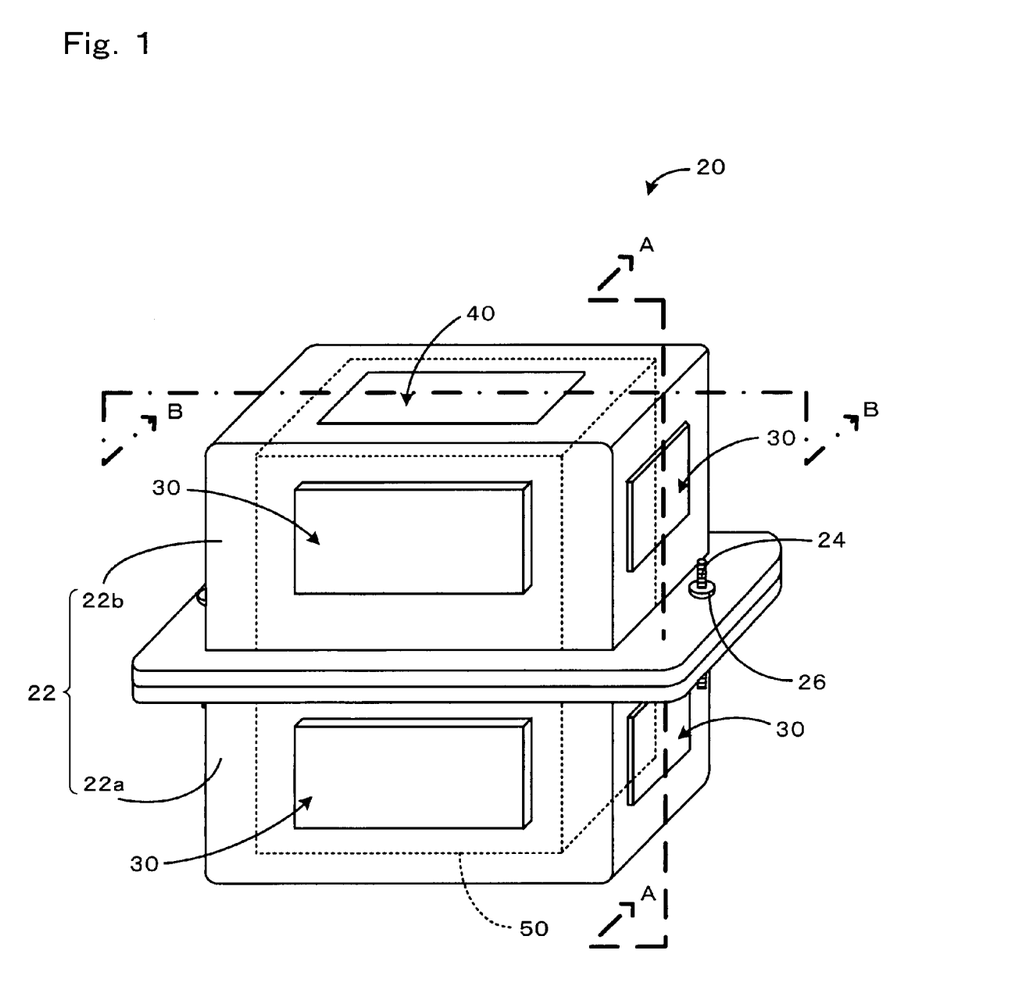
FIG. 1 schematically illustrates the appearance of a fuel cell casing in one embodiment of the invention.
Figure 2:
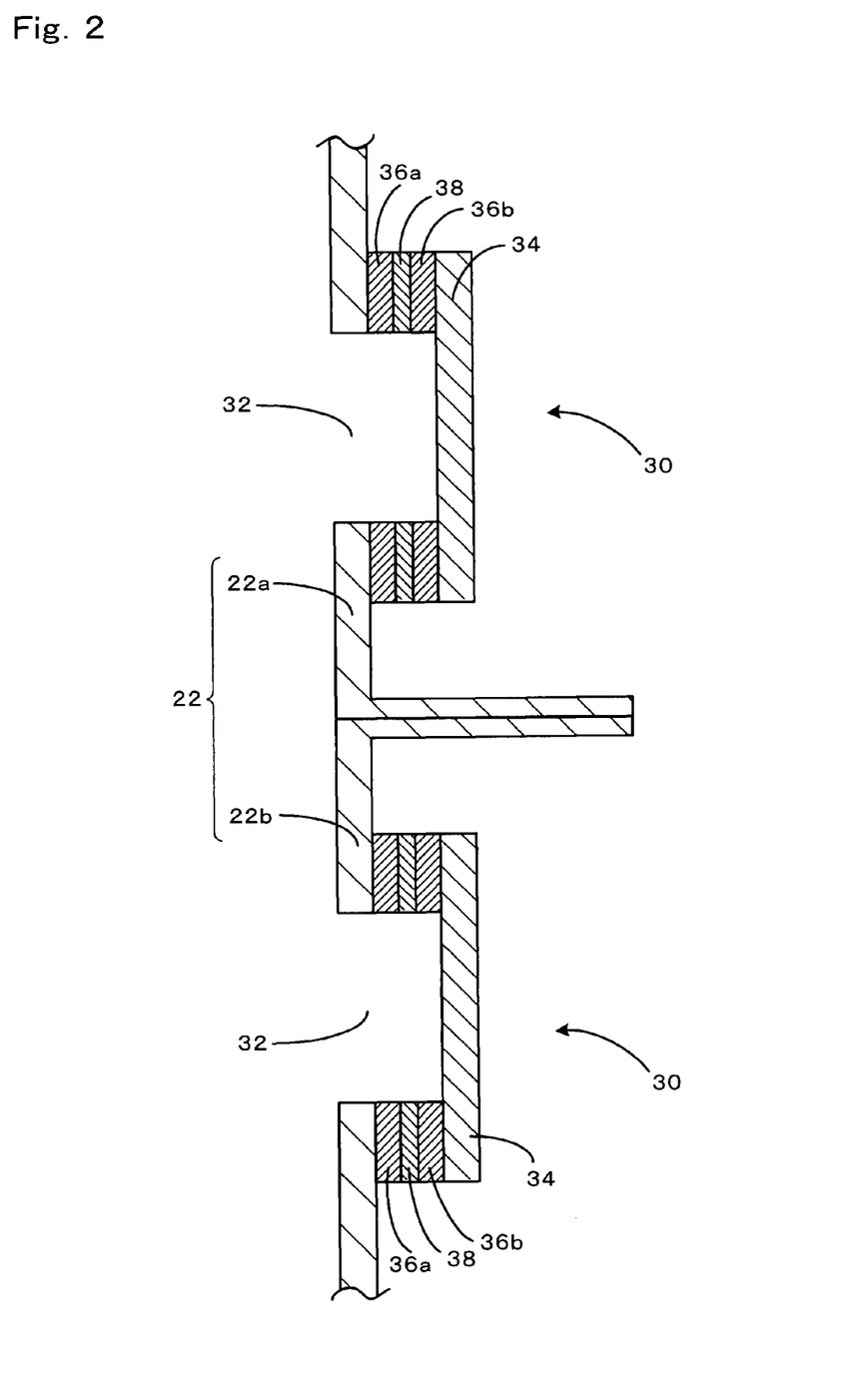
FIG. 2 is an enlarged sectional view showing one structure of the fuel cell casing, taken on the line A-A in FIG. 1.
Figure 3:
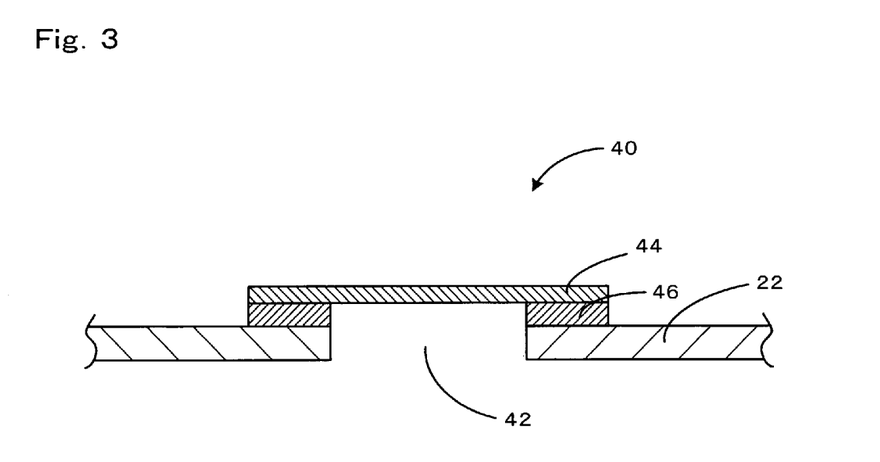
FIG. 3 is an enlarged sectional view showing the structure of the fuel cell casing, taken on the line B-B in FIG. 1.

One mode of carrying out the invention is described below as a preferred embodiment with reference to the accompanied drawings. FIG. 1 schematically illustrates the appearance of a fuel cell casing 20 in one embodiment of the invention. FIG. 2 is an enlarged sectional view showing one structure of the fuel cell casing 20, taken on the line A-A in FIG. 1. FIG. 3 is an enlarged sectional view showing the structure of the fuel cell casing 20, taken on the line B-B in FIG. 1. The fuel cell casing 20 of this embodiment includes a casing body 22 that is a main body of the fuel cell casing 20 and protectively stores fuel cells 50 therein, pressure release elements 30 that are formed in the casing body 22 and work to release the inner pressure of the casing, and a gas permeation element 40 that is formed in the casing body 22 and allows permeation of only the gas components.

The casing body 22 includes a resin lower case 22a that has an upper rim and forms a lower half of the casing body 22, and a resin upper cover 22b that has the same shape as the lower case 22a and forms an upper half of the casing body 22. The upper rim of the lower case 22a and the lower rim of the upper cover 22b are in contact with each other to make the respective openings face each other. The lower case 22a is fastened to the upper cover 22b with nuts 26 and bolts 24 inserted in holes (not shown) formed in the respective rims. The upper cover 22b seals the upper opening of the lower case 22a. The lower case 22a and the upper cover 22b may have different shapes, instead of the identical shape.

In the structure of this embodiment, the total of four pressure release elements 30 are formed in two respective side faces of the lower case 22a and the upper cover 22b of the casing body 22. As shown in FIG. 2, each of the pressure release elements 30 includes a depressurizing hole 32 that releases the inner pressure of the casing, a resin depressurizing cover 34 that covers over the depressurizing hole 32, a first double-sided adhesive tape 36a that is stuck on its one face to the casing body 22 along the circumference of the depressurizing hole 32, a second double-sided adhesive tape 36b that is stuck to the depressurizing cover 34 on its other face opposite to one face close to the first double-sided adhesive tape 36a, and an interposed member 38 that is interposed between the first double-sided adhesive tape 36a and the second double-sided adhesive tape 36b. In the structure of this embodiment, the interposed member 38 is a membrane made of the same material as that of a gas permeation membrane 44 (described later). Each of the first double-sided adhesive tape 36a and the second double-sided adhesive tape 36b has a resin tape base with an adhesive applied on two sides thereof, as is well known in the art. The first double-sided adhesive tape 36a and the second double-sided adhesive tape 36b have substantially the same adhesion areas as the adhesion areas of the respective adherend surfaces. In the ordinary state, the depressurizing cover 34 of each pressure release element 30 adheres tightly to the casing body 22 via the laminate structure of the first double-sided adhesive tape 36a, the interposed membrane 38, and the second double-sided adhesive tape 36b, so as to prevent electric shocks and invasion of rainwater through the depressurizing hole 32. When the inner pressure of the casing increases to a preset level, the depressurizing cover 34 is separated from the casing body 22 to release the pressure from the depressurizing hole 32. While the casing body 22 and the depressurizing cover 34 are made of resin, the interposed member 38 is the membrane made of the same material as that of the gas permeation membrane 44. At least one of the adhesive force of the first double-sided adhesive tape 36a to the interposed member 38 and the adhesive force of the second double-sided adhesive tape 36b to the interposed member 38 is accordingly smaller than the adhesive force of the first double-sided adhesive tape 36a to the casing body 22 and the adhesive force of the second double-sided adhesive tape 36b to the depressurizing cover 34. Under the preset level of the inner pressure of the casing, the depressurizing cover 34 is separated from the casing body 22 at the adhesive face of the first double-sided adhesive tape 36a or the adhesive face of the second double-sided adhesive tape 36b to the interposed member 38. In this state, the force applied to the depressurizing cover 34 under the preset level of the inner pressure may be insufficient for separation of the adhesive face of the first double-sided adhesive tape 36a from the casing body 22 and for separation of the adhesive face of the second double-sided adhesive tape 36b from the depressurizing cover 34. The preset level of the inner pressure is experimentally or otherwise determined according to the materials of the constituents of the fuel cell casing 20 to be not greater than a destructive pressure of the casing body 22. For example, the preset level of the inner pressure may be several times as much as the atmospheric pressure. The opening area of the depressurizing hole 32 is set experimentally or otherwise, so that the force applied to the depressurizing cover 34 under the preset level of the inner pressure overcomes the adhesive force of the first double-sided adhesive tape 36a or the second double-sided adhesive tape 36b to the interposed member 38.

In the structure of this embodiment, only one gas permeation element 40 is formed in the top face of the casing body 22. As shown in FIG. 3, the gas permeation element 40 has an air hole 42 formed in the casing body 22, a gas permeation membrane 44 that is made of the same material as that of the interposed member 38 and covers over the air hole 42, and a third double-sided adhesive tape 46 that is made of the same material as that of the first double-sided adhesive tape 36a and the second double-sided adhesive tape 36b and has substantially the same adhesion area as those of the first double-sided adhesive tape 36a and the second double-sided adhesive tape 36b. The third double-sided adhesive tape 46 is stuck to the casing body 22 on its one face along the circumference of the air hole 42 and is stuck to the gas permeation membrane 44 on its other face. The gas permeation membrane 44 is made of a porous material that allows permeation of the gas components including hydrogen and the air but prohibits permeation of water. One example of the commercially available material for the gas permeation membrane 44 is 'Poreflon' manufactured by Sumitomo Electric Fine Polymer Inc. In the ordinary state, the gas permeation membrane 44 of the gas permeation element 40 adheres tightly to the casing body 22 by means of the third double-sided adhesive tape 46, so as to prevent invasion of rainwater through the air hole 42. In the event of any leakage of even a tracing amount of hydrogen from the fuel cells 50, the leaked hydrogen is discharged via the gas permeation membrane 44 to the atmosphere. This effectively prevents unintentional ignition of hydrogen in the casing. When the inner pressure of the casing increases to the preset level, the gas permeation membrane 44 is separated from the casing body 22 to release the pressure from the air hole 42. The casing body 22 is made of resin, while the gas permeation membrane 44 is made of the porous material. The adhesive force of the third double-sided adhesive tape 46 to the casing body 22 is accordingly greater than the adhesive force of the third double-sided adhesive tape 46 to the gas permeation membrane 44. Under the preset level of the inner pressure of the casing, the gas permeation membrane 44 is separated from the casing body 22 at the adhesive face of the third double-sided adhesive tape 46 to the gas permeation membrane 44. In this state, the force applied to the gas permeation membrane 44 under the preset level of the inner pressure may be insufficient for separation of the adhesive face of the third double-sided adhesive tape 46 from the casing body 22. The gas permeation element 40 functions to discharge hydrogen from the casing and to release the inner pressure of the casing in response to a pressure increase to the preset level. The opening area of the air hole 42 is set experimentally or otherwise, so that the force applied to the gas permeation membrane 44 under the preset level of the inner pressure overcomes the adhesive force of the third double-sided adhesive tape 46 to the gas permeation membrane 44. In the structure of this embodiment, the opening area of the air hole 42 is substantially identical with the opening area of the depressurizing hole 32. The adhesion area between the third double-sided adhesive tape 46 and the gas permeation membrane 44 is substantially the same as the adhesion area between the first double-sided adhesive tape 36a and the interposed member 38 and the adhesion area between the second double-sided adhesive tape 36b and the interposed member 38. Since the gas permeation membrane 44 and the interposed member 38 are made of the same material, the adhesive strength of the third double-sided adhesive tape 46 is substantially the same as the adhesive strength of the first double-sided adhesive tape 36a and the adhesive strength of the second double-sided adhesive tape 36b. The adhesive force (=adhesion area×adhesive strength) of the third double-sided adhesive tape 46 to the gas permeation membrane 44 is thus practically equivalent to the adhesive force of the first double-sided adhesive tape 36a to the interposed member 38 and the adhesive force of the second double-sided adhesive tape 36b to the interposed member 38.

It is here assumed that a tracing amount of hydrogen is leaked from the fuel cells 50 stored in the fuel cell casing 20 of the embodiment and is ignited by some cause. Hydrogen ignited in the presence of oxygen is combusted at a high combustion rate. Combustion of hydrogen abruptly raises the inner pressure of the casing. The raised inner pressure is applied in a direction of separating the depressurizing cover 34 and the gas permeation membrane 44 from the casing body 22.

When the increasing inner pressure of the casing reaches the preset level, the adhesive face of the first double-sided adhesive tape 36a or the adhesive face of the second double-sided adhesive tape 36b of the pressure release element 30 is detached from the interposed membrane 38. This separates the depressurizing cover 34 of the pressure release element 30 from the casing body 22. At substantially the same time, the adhesive face of the third double-sided adhesive tape 46 of the gas permeation element 40 is detached from the gas permeation membrane 44. This separates the gas permeation membrane 44 of the gas permeation element 40 from the casing body 22. The substantially simultaneous separation of the depressurizing cover 34 and the gas permeation membrane 44 is ascribed to the substantially identical opening areas of the depressurizing hole 32 and the air hole 42. The identical opening areas cause the force applied to the depressurizing cover 34 to be practically the same as the force applied to the gas permeation membrane 44 under the preset level of the inner pressure of the casing. The adhesive force of the third double-sided adhesive tape 46 to the gas permeation membrane 44 is practically the same as the adhesive force of the first double-sided adhesive tape 36a to the interposed member 38 and the adhesive force of the second double-sided adhesive tape 36b to the interposed member 38. This also leads to the substantially simultaneous separation of the depressurizing cover 34 and the gas permeation membrane 44. The inner pressure of the casing is released from both the depressurizing holes 32 and the air hole 42 and is thereby lowered rapidly.

The gas permeation membrane 44 is made of the porous material having a large number of small pores. Release of the pressure through these pores may cause a slight difference between the pressure applied to the gas permeation membrane 44 and the pressure applied to the depressurizing cover 34. While the pressure is released from the pores of the gas permeation membrane 44 at a very slow rate, ignition of hydrogen abruptly increases the inner pressure of the casing. The force applied to the gas permeation membrane 44 and the force applied to the depressurizing cover 34 under the preset level of the inner pressure accordingly have a difference only within the margin of error and are regarded to be substantially equivalent.

In the fuel cell casing 20 of the embodiment described above, adequate selection of the material for the interposed member 38 readily attains the desired design of ensuring easy separation of the depressurizing cover 34 from the casing body 22 by simple application of the force to the depressurizing cover 34 under the preset level of the inner pressure, without changing the materials of the casing body 22 and the depressurizing cover 34. Here the force applied to the depressurizing cover 34 under the preset level of the inner pressure may be insufficient for separation of the adhesive face of the first double-sided adhesive tape 36a from the casing body 22 and for separation of the adhesive face of the second double-sided adhesive tape 36b from the depressurizing cover 34.

Adequate selection of the common material for the interposed member 38 and for the gas permeation membrane 44 enables desired design of ensuring the substantially simultaneous separation of the depressurizing cover 34 and the gas permeation membrane 44 from the casing body 22. The sufficient release of the inner pressure through the depressurizing holes 32 and the air hole 42 effectively protects the casing body 22 from damages.

The embodiment discussed above is to be considered in all aspects as illustrative and not restrictive. There may be many modifications, changes, and alterations without departing from the scope or spirit of the main characteristics of the present invention.

The fuel cell casing 20 of the embodiment has the gas permeation element 40 having the function of allowing permeation of only the gas components and the function of releasing the inner pressure. The gas permeation element 40 may be replaced by any cover-like element having the function of releasing the inner pressure in addition to its original function.

Figure 4:
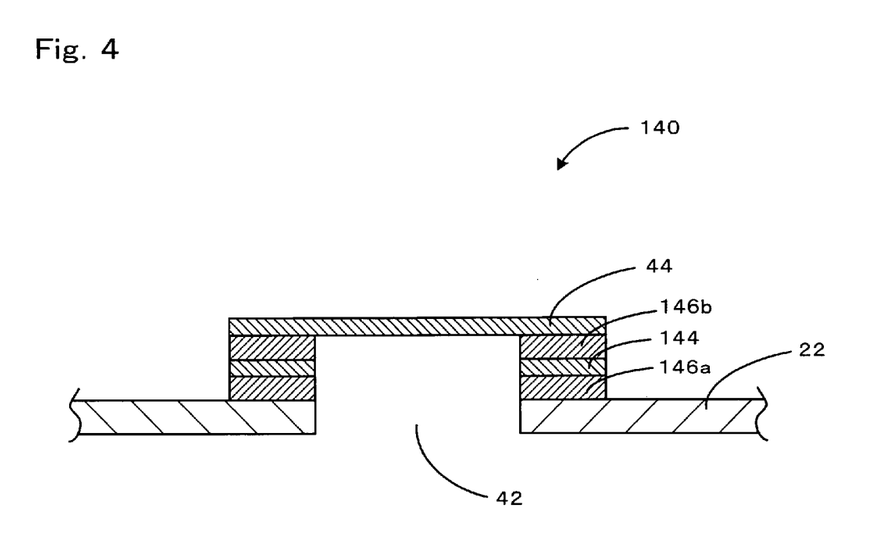
FIG. 4 is an enlarged sectional view showing another structure of the fuel cell casing, taken on the line B-B in FIG. 1.
Figure 5:
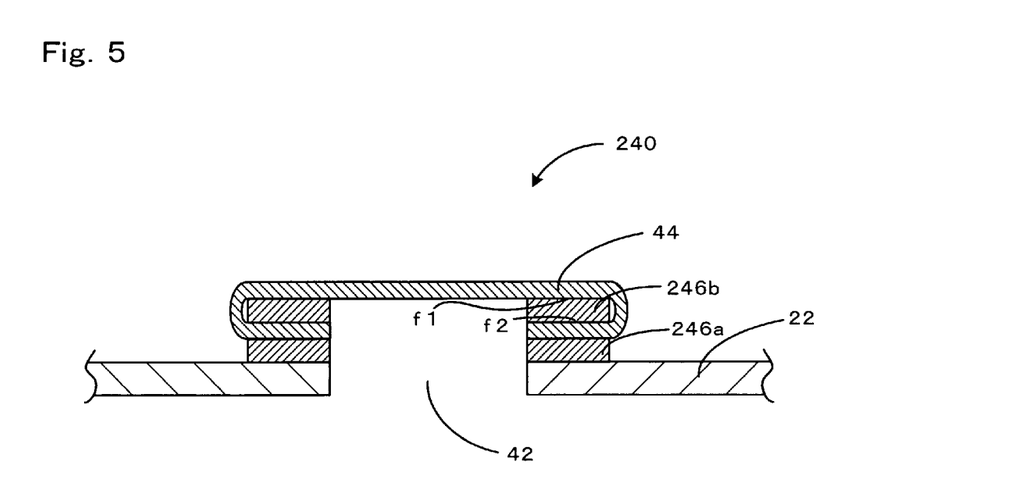
FIG. 5 is an enlarged sectional view showing still another structure of the fuel cell casing, taken on the line B-B in FIG. 1.
Figure 6:
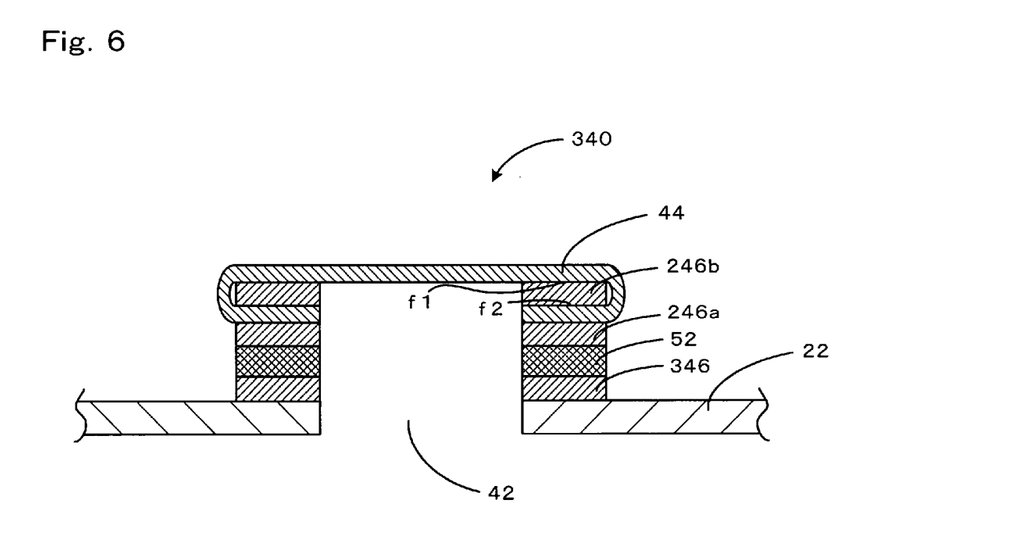
FIG. 6 is an enlarged sectional view showing another structure of the fuel cell casing, taken on the line B-B in FIG. 1.

The gas permeation element 40 of the structure shown in FIG. 3 may be replaced by any of other gas permeation elements 140, 240, and 340 of different structures shown in FIGS. 4, 5, and 6. The gas permeation element 140 of FIG. 4 includes a third double-sided adhesive tape 146a that is stuck on its one face to the casing body 22 along the circumference of the air hole 42, a third double-sided adhesive tape 146b that is stuck to the gas permeation membrane 44 on its other face opposite to one face close to the third double-sided adhesive tape 146a, and a gas permeation membrane 144 that is interposed between the third double-sided adhesive tape 146a and the third double-sided adhesive tape 146b. When the inner pressure of the casing increases to the preset level, the adhesive face of the third double-sided adhesive tape 146b of the gas permeation element 140 is detached from the gas permeation membrane 44. This separates the gas permeation membrane 44 of the gas permeation element 140 from the casing body 22. In the gas permeation element 240 of FIG. 5, an inner area of the gas permeation membrane 44 inside its circumferential end is stuck to one adhesive face f1 of a third double-sided adhesive tape 246b along the circumference of the air hole 42. The circumferential end of the gas permeation membrane 44, which is not stuck to the third double-sided adhesive tape 246b, folds over the third double-sided adhesive tape 246b and is stuck to the other adhesive face f2 of the third double-sided adhesive tape 246b. A third double-sided adhesive tape 246a is stuck on its one face to the casing body 22 along the circumference of the air hole 42 and is stuck on its other face to the folded circumferential end of the gas permeation membrane 44. When the inner pressure of the casing increases to the preset level, the adhesive face f1 of the third double-sided adhesive tape 246b is detached from the gas permeation membrane 44. The adhesive face of the third double-sided adhesive tape 246a is then detached from the folded circumferential end of the gas permeation membrane 44. The gas permeation membrane 44 is accordingly separated from the casing body 22. The gas permeation element 340 of FIG. 6 further includes a third double-sided adhesive member 346 and a resin frame 52 between the casing body 22 and the third double-sided adhesive tape 246a, in addition to the constituents of the gas permeation element 240 of FIG. 5. The third double-sided adhesive member 346 is stuck on its one face to the casing body 22, and the resin frame 52 is interposed between the third double-sided adhesive member 346 and the third double-sided adhesive tape 246a and is formed along the air hole 42. The resin fame 52 works to keep the shape of the gas permeation membrane 44. When the inner pressure of the casing increases to the preset level, the adhesive face f1 of the third double-sided adhesive tape 246b is detached from the gas permeation membrane 44. The adhesive face of the third double-sided adhesive tape 246a is then detached from the folded circumferential end of the gas permeation membrane 44. The gas permeation membrane 44 is accordingly separated from the casing body 22.

In the structure of the embodiment described above, the depressurizing cover 34 is attached to the casing body 22 via the double-sided adhesive tapes stuck along the circumference of the depressurizing hole 32. In one possible modification, one part of the depressurizing cover 34 is fastened to the casing body 22 by means of a hinge, while a remaining part of the depressurizing cover 34 is attached to the casing body 22 by means of the first double-sided adhesive tape 36a, the interposed member 38, and the second double-sided adhesive tape 36b. In this modified structure, when the inner pressure of the casing increases to the preset level, the adhesive face of the first double-sided adhesive tape 36a or the adhesive face of the second double-sided adhesive tape 36b is detached from the interposed member 38. The depressurizing cover 34 is opened about the hinge as the point of support to release the inner pressure of the casing.

In the structure of the embodiment described above, the opening area of the depressurizing hole 32 is substantially identical with the opening area of the air hole 42. The interposed member 38 and the gas permeation membrane 44 are made of the same material. The first, second, and third double-sided adhesive tapes 36a, 36b, and 46 are made of the same material to have the identical adhesive strengths. There are practically the same adhesion areas between the first double-sided adhesive tape 36a, the second double-sided adhesive tape 36b, and the third double-sided adhesive tape 46 and the respective adherend surfaces. These conditions are, however, not essential. The opening areas of depressurizing hole 32 and the air hole 42, the materials of the interposed member 38 and the gas permeation membrane 44, and the adhesive strengths and the adhesion areas of the first, second, and third double-sided adhesive tapes 36a, 36b, and 46 are controlled and determined adequately, so that the adhesive force of at least either the first double-sided adhesive tape 36a or the second double-sided adhesive tape 36b to the interposed member 38 is practically equivalent to a force F1 applied to the depressurizing cover 34 under the preset level of the inner pressure and that the adhesive force of the third double-sided adhesive tape 46 to the gas permeation membrane 44 is practically equivalent to a force F2 applied to the gas permeation membrane 44 under the preset level of the inner pressure. Such control and determination ensure the substantially simultaneous separation of the depressurizing cover 34 and the gas permeation membrane 44 in response to an increase in inner pressure of the casing to the preset level, even when the depressurizing hole 32 and the air hole 42 have different opening areas, when the interposed member 38 and the gas permeation membrane 44 are made of different materials, or when the first, second, and third double-sided adhesive tapes 36a, 36b, and 46 have different adhesive strengths or different adhesion areas.

The double-sided adhesive tape used as the double-sided adhesion member in the embodiment may be replaced by any other double-sided adhesion member having the adhesive function on two sides.

The fuel cell casing 20 of the embodiment has the four pressure release elements 30 formed in the two side faces of the casing body 22 and one gas permeation element 40 formed in the top face of the casing body 22. The numbers of the pressure release elements 30 and the gas permeation elements 40 are not restricted to these values but may be increased or decreased. The pressure release element 30 may be formed in the top face or the bottom face of the casing body 22, and the gas permeation element 40 may be formed in the side face or the bottom face of the casing body 22.

The resin casing body 22 of the embodiment may be replaced with an aluminum casing body.

The present application claims the priority from Japanese Patent Application No. 2005-052024 filed on Feb. 25, 2005, the contents of which are hereby incorporated by reference into this application.

INDUSTRIAL APPLICABILITY

The technique of the invention is preferably applied to vehicles, electronic equipment, household equipment, and plant facilities equipped with fuel cells.

The invention claimed is:

1. A fuel cell casing for storing fuel cells therein, said fuel cell casing comprising:
   a casing body;
   a depressurizing hole that is formed in the casing body to release inner pressure of the fuel cell casing;
   a cover member that covers over the depressurizing hole;
   a first double-sided adhesive member that has adhesive function on two faces thereof and is stuck on its one face to the casing body along circumference of the depressurizing hole;
   a second double-sided adhesive member that has adhesive function on two faces thereof and is stuck to the cover member on its other face opposite to one face close to the first double-sided adhesive member; and
   an interposed member that is interposed between the first double-sided adhesive member and the second double-sided adhesive member and is detached, in response to an increase in inner pressure of said fuel cell casing to a preset level, at least one of an adhesive face of the first double-sided adhesive member to the interposed member and an adhesive face of the second double-sided adhesive member to the interposed member, prior to detachment of the first double-sided adhesive member from the casing body and detachment of the second double-sided adhesive member from the cover member,
   said fuel cell casing further comprising:
   an air hole that is formed in the casing body for air vent;
   a gas permeation membrane that covers over the air hole and allows permeation of only a gas component; and
   a third double-sided adhesive member that has adhesive function on two faces thereof, is stuck on its one face to the casing body along circumference of the air hole, and is stuck on its other face to the gas permeation membrane so that the other face of the third double-sided adhesive member is detached from the gas permeation membrane in response to an increase in inner pressure of said fuel cell casing to a certain level equivalent to the preset level, wherein the cover and the gas permeation membrane simultaneously separate when the inner pressure of the casing is released from both the depressurizing hole and the air hole to rapidly lower the same.

2. A fuel cell casing for storing fuel cells therein, said fuel cell casing comprising:
  a casing body;
  a depressurizing hole that is formed in the casing body to release inner pressure of the fuel cell casing;
  a cover member that covers over the depressurizing hole;
  a first double-sided adhesive member that has adhesive function on two faces thereof and is stuck on its one face to the casing body along circumference of the depressurizing hole;
  a second double-sided adhesive member that has adhesive function on two faces thereof and is stuck to the cover member on its other face opposite to one face close to the first double-sided adhesive member; and
  an interposed member that is interposed between the first double-sided adhesive member and the second double-sided adhesive member and is bonded to the first double-sided adhesive member and to the second double-sided adhesive member, where at least one of an adhesive force of the interposed member to the first double-sided adhesive member and an adhesive force of the interposed member to the second double-sided adhesive member is smaller than an adhesive force of the first double-sided adhesive member to the casing body and an adhesive force of the second double-sided adhesive member to the cover member,
  said fuel cell casing further comprising:
    an air hole that is formed in the casing body for air vent;
    a gas permeation membrane that covers over the air hole and allows permeation of only a gas component; and
    a third double-sided adhesive member that has adhesive function on two faces thereof, is stuck on its one face to the casing body along circumference of the air hole, and is stuck on its other face to the gas permeation membrane with an adhesive force practically equivalent to an adhesive force of at least either the first double-sided adhesive member or the second double-sided adhesive member to the interposed member,
  wherein the cover and the gas permeation membrane simultaneously separate when the inner pressure of the casing is released from both the depressurizing hole and the air hole to rapidly lower the same.

3. A fuel cell casing in accordance with claim 1, wherein the interposed member is made of the same material as the gas permeation membrane.

4. A fuel cell casing in accordance with claim 1, wherein at least one of the first double-sided adhesive member, and the second double-sided adhesive member is a double-sided adhesive tape including a base member with an adhesive applied on two faces thereof.

5. A fuel cell casing in accordance with claim 1, wherein at least one of the first double-sided adhesive member, the second double-sided adhesive member, and the third double-sided adhesive member is a double-sided adhesive tape including a base member with an adhesive applied on two faces thereof.

6. A fuel cell casing in accordance with claim 1, wherein the cover member is fixed to the casing body in freely openable and closable manner.

7. A fuel cell casing in accordance with claim 2, wherein the interposed member is made of the same material as the gas permeation membrane.

8. A fuel cell casing in accordance with claim 2, wherein at least one of the first double-sided adhesive member and the second double-sided adhesive member is a double-sided adhesive tape including a base member with an adhesive applied on two faces thereof.

9. A fuel cell casing in accordance with claim 2, wherein at least one of the first double-sided adhesive member, the second double-sided adhesive member, and the third double-sided adhesive member is a double-sided adhesive tape including a base member with an adhesive applied on two faces thereof.

10. A fuel cell casing in accordance with claim 2, wherein the cover member is fixed to the casing body in freely openable and closable manner.

11. A fuel cell casing for storing fuel cells therein, said fuel cell casing comprising:
  a casing body;
  a depressurizing hole that is formed in the casing body to release inner pressure of the fuel cell casing;
  a cover member that covers over the depressurizing hole;
  a first double-sided adhesive member that has adhesive function on two faces thereof and is stuck on its one face to the casing body along circumference of the depressurizing hole;
  a second double-sided adhesive member that has adhesive function on two faces thereof and is stuck to the cover member on its other face opposite to one face close to the first double-sided adhesive member; and
  an interposed member that is interposed between the first double-sided adhesive member and the second double-sided adhesive member and is detached, in response to an increase in inner pressure of said fuel cell casing to a preset level, at at least one of an adhesive face of the first double-sided adhesive member to the interposed member and an adhesive face of the second double-sided adhesive member to the interposed member, prior to detachment of the first double-sided adhesive member from the casing body and detachment of the second double-sided adhesive member from the cover member,
  said fuel cell casing further comprising:
    an air hole that is formed in the casing body for air vent;
    a gas permeation membrane that covers over the air hole and allows permeation of only a gas component; and
    a third double-sided adhesive member that has adhesive function on two faces thereof, is stuck on its one face to the casing body along circumference of the air hole, and is stuck on its other face to the gas permeation membrane so that the other face of the third double-sided adhesive member is detached from the gas permeation membrane in response to an increase in inner pressure of said fuel cell casing to a certain level equivalent to the preset level,
  wherein the interposed member is made of the same material as the gas permeation membrane.

12. A fuel cell casing for storing fuel cells therein, said fuel cell casing comprising:
  a casing body;
  a depressurizing hole that is formed in the casing body to release inner pressure of the fuel cell casing;
  a cover member that covers over the depressurizing hole;

a first double-sided adhesive member that has adhesive function on two faces thereof and is stuck on its one face to the casing body along circumference of the depressurizing hole;
a second double-sided adhesive member that has adhesive function on two faces thereof and is stuck to the cover member on its other face opposite to one face close to the first double-sided adhesive member; and
an interposed member that is interposed between the first double-sided adhesive member and the second double-sided adhesive member and is bonded to the first double-sided adhesive member and to the second double-sided adhesive member, where at least one of an adhesive force of the interposed member to the first double-sided adhesive member and an adhesive force of the interposed member to the second double-sided adhesive member is smaller than an adhesive force of the first double-sided adhesive member to the casing body and an adhesive force of the second double-sided adhesive member to the cover member,
said fuel cell casing further comprising:
an air hole that is formed in the casing body for air vent;
a gas permeation membrane that covers over the air hole and allows permeation of only a gas component; and
a third double-sided adhesive member that has adhesive function on two faces thereof, is stuck on its one face to the casing body along circumference of the air hole, and is stuck on its other face to the gas permeation membrane with an adhesive force practically equivalent to an adhesive force of at least either the first double-sided adhesive member or the second double-sided adhesive member to the interposed member,
wherein the interposed member is made of the same material as the gas permeation membrane.

* * * * *

UNITED STATES PATENT AND TRADEMARK OFFICE
CERTIFICATE OF CORRECTION

| | | |
|---|---|---|
| PATENT NO. | : 7,906,232 B2 | Page 1 of 1 |
| APPLICATION NO. | : 11/661701 | |
| DATED | : March 15, 2011 | |
| INVENTOR(S) | : Hideyuki Tanaka | |

It is certified that error appears in the above-identified patent and that said Letters Patent is hereby corrected as shown below:

On the cover page column 1: Change "(86) PCT No.: PCT/JP2006/003412" to

--(86) PCT No.: PCT/JP2006/303412--.

| Column | Line | |
|---|---|---|
| 1 | 67 | Before "least" insert --at--. |

Signed and Sealed this
Sixteenth Day of August, 2011

David J. Kappos
*Director of the United States Patent and Trademark Office*